United States Patent
Laskaris et al.

(10) Patent No.: US 6,438,969 B1
(45) Date of Patent: Aug. 27, 2002

(54) CRYOGENIC COOLING REFRIGERATION SYSTEM FOR ROTOR HAVING A HIGH TEMPERATURE SUPER-CONDUCTING FIELD WINDING AND METHOD

(75) Inventors: Evangelos Trifon Laskaris; Robert Adolph Ackermann, both of Schenectady; Yu Wang, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/902,798

(22) Filed: Jul. 12, 2001

(51) Int. Cl.[7] .................................................. F25B 19/00
(52) U.S. Cl. .......................................... 62/51.1; 310/62
(58) Field of Search ............................... 62/51.1; 310/52

(56) References Cited

U.S. PATENT DOCUMENTS

| | | |
|---|---|---|
| 3,991,587 A | 11/1976 | Laskaris |
| 3,991,588 A | 11/1976 | Laskaris |
| 4,018,059 A | 4/1977 | Hatch |
| 4,101,793 A | 7/1978 | Berthet et al. |
| 4,164,126 A | 8/1979 | Laskaris et al. |
| 4,207,745 A | 6/1980 | Pouillange |
| 4,289,985 A | 9/1981 | Popov et al. |
| 4,329,849 A | 5/1982 | Hofmann et al. |
| 4,488,406 A | 12/1984 | Eckels |
| 4,745,760 A | 5/1988 | Porter |
| 4,884,409 A * | 12/1989 | Quack et al. ................. 62/51.1 |
| 5,293,750 A * | 3/1994 | Tamura et al. ................ 62/51.1 |
| 5,548,168 A | 8/1996 | Laskaris et al. |
| 5,586,437 A | 12/1996 | Blecher et al. |
| 5,848,532 A | 12/1998 | Gamble et al. |
| 5,953,224 A | 9/1999 | Gold et al. |
| 6,123,119 A | 9/2000 | Okumura |
| 6,131,647 A | 10/2000 | Suzuki et al. |
| 6,173,577 B1 | 1/2001 | Gold |

FOREIGN PATENT DOCUMENTS

JP    10-311618    11/1998

OTHER PUBLICATIONS

Fast, Reactive Power Support, *HTS Generators*, American Superconductor™(Feb. 27, 2001)pp. 1–4.

* cited by examiner

Primary Examiner—Ronald Capossela
(74) Attorney, Agent, or Firm—Nixon & Vanderhye, P.C.

(57) ABSTRACT

A cooling fluid system is disclosed for providing cryogenic cooling fluid to a high temperature super-conducting rotor comprising: a re-circulation compressor; a storage tank having a second cryogenic fluid; an inlet line connecting the re-circulation compressor to the storage tank and to the rotor, and forming a passage for cooling fluid to pass from the re-circulation compressor through the storage tank and to the apparatus.

19 Claims, 5 Drawing Sheets

CRYOGENIC COOLING REFRIGERATION SYSTEM FOR ROTOR HAVING A HIGH TEMPERATURE SUPER-CONDUCTING FIELD WINDING AND METHOD

BACKGROUND OF THE INVENTION

The present invention relates generally to a cryogenic cooling system for a synchronous machine having a rotor with a high temperature super-conducting (HTS) component. More particularly, the present invention relates to a cooling system to provide cryogenic fluid to the rotor and to re-cool used cooling fluid returned from the rotor.

Super-conductive rotors have their super-conducting coils cooled by liquid helium, with the used helium being returned as room-temperature gaseous helium. Using liquid helium for cryogenic cooling requires continuous reliquefaction of the returned, room-temperature gaseous helium, and such reliquefaction poses significant reliability problems and requires significant auxiliary power. Accordingly, there is a need for a cryogenic cooling system that reliquefies the hot, used cooling fluid returned from the rotor. The reliquefied cooling fluid should then be available for re-use as an HTS rotor cooling fluid.

High temperature super-conducting generators require highly-reliable, low cost cryorefrigeration equipment in order to be viable as commercial products. Redundant cryorefrigerator components have in the past been used to achieve high reliability with existing cryorefrigeration equipment. The inadequate reliability of these components and the requirement that HTS rotors have an uninterrupted supply of cooling fluid have in the past necessitated that redundant components be included in cryorefrigeration systems for HTS rotors.

The cost of cryorefrigeration systems is substantially increased due to the need for redundant cryorefrigerator components. Moreover, existing cryorefrigeration systems require frequent maintenance due to their inadequate reliability and system redundancies. Accordingly, the operating cost of these systems is relatively high.

Typical cryorefrigerator equipment for the temperature range of 20–30° Kelvin is based on Gifford McMahon coldhead technology that has limited refrigerator capacity and requires maintenance about once a year. Multiple units can be combined to increase the capacity and reliability of the system at the expense of increased cost. In addition to multiple coldheads, closed loop circulation systems of cryogen gas require either cold re-circulation fans, or external warm re-circulation fans with counter-flow highly-efficient heat exchangers. These components add cost and complexity to the system when redundancy for high reliability is required, unless all components can be built with six sigma quality.

The purchase and operating costs of existing cryorefrigeration systems significantly add to the cost of machines having HTS rotors. These high costs have contributed to the heretofore-commercial impracticalities of incorporating HTS rotors into commercially-marketable synchronous machines. Accordingly, there is a substantial and previously un-met need for cryorefrigeration systems that are less expensive, inexpensive to operate and provide a reliable supply of cryogenic cooling fluid to an HTS rotor.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron forging.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate an air-gap magnetic field strength of about 2 Tesla. Known super-conducting rotors employ air-core designs, with no iron in the rotor, to achieve air-gap magnetic fields of 3 Tesla or higher, which increase the power density of the electrical machine and result in significant reduction in weight and size. Air-core super-conducting rotors, however, require large amounts of super-conducting wire, which adds to the number of coils required, the complexity of the coil supports, and the cost.

BRIEF SUMMARY OF THE INVENTION

A cryogen gas re-circulation cooling system has been developed for a High Temperature Super-conducting (HTS) rotor. This cooling system generally comprises a re-circulation compressor, a counter-flow heat exchanger, and a cooling coil heat exchanger inside a liquid cryogen storage tank. Cooling fluid flows from the re-circulation compressor through the heat exchanger and coiling cool (where the fluid is cooled to cryogenic temperatures) and then to the rotor and its super-conducting coil. Used cooling fluid is returned from the rotor, through the counter-flow heat exchanger (where heat from the compressed cooling fluid passing to the rotor is transferred to the used gas) and back to the re-circulation compressor.

The liquid cryogen in the storage tank is cooled by a re-condenser cryorefrigerator. The recondenser cryorefrigerator may be a single stage Gifford-McMahon (GM) cryocooler, a pulse tube with separate or integral compressor with a re-condenser unit attached to the single stage, or other such cryogen cooling system. The liquid cryogen may be nitrogen, neon, or hydrogen. Similarly, the cryogen gas in the re-circulation system may be helium, hydrogen, neon, or nitrogen.

The cooling system provides a steady supply of cooling fluid to an HTS rotor. Moreover, the cooling system is economical in its construction and operation. The reliability and economy of the cooling system facilitates the development of a commercially viable synchronous machine with an HTS rotor.

In a first embodiment, the invention is a cooling fluid system for providing cryogenic cooling fluid to a high temperature super-conducting machine comprising: a re-circulation compressor; a storage tank having a second cryogenic fluid; an inlet line connecting the re-circulation compressor to the storage tank and to the rotor, and forming a passage for cooling fluid to pass from the re-circulation compressors through the storage tank and to the machine.

In another embodiment, the invention is a cooling fluid system coupled to a high temperature super-conducting rotor for a synchronous machine, said system and a source of cryogenic cooling fluid comprising: a re-circulation compressor; a cryogenic storage tank storing a supply of cryogenic fluid; an inlet line providing a fluid passage for cooling fluid between the re-circulation compressor and the rotor, wherein the inlet line passes through the storage tank, and a return line providing a fluid passage for the cooling fluid between the rotor and re-circulation compressor.

In a further embodiment, the invention is a method for cooling a super-conducting machine using a cooling fluid system having a cooling fluid circuit, a cryogenic storage tank, a heat exchanger and inlet and return lines for cooling fluid, said method comprising the steps of:

a. pumping the cryogenic cooling fluid through inlet line, through the heat exchanger, the storage tank and into the machine;

b. transferring heat from the cooling fluid in the inlet line at the heat exchanger and into the return line, where the inlet and return lines pass through the heat exchanger;

c. cooling the cooling fluid to cryogenic temperature in the storage tank, and d. returning used cooling fluid from the machine, through the return line and back to the inlet line.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
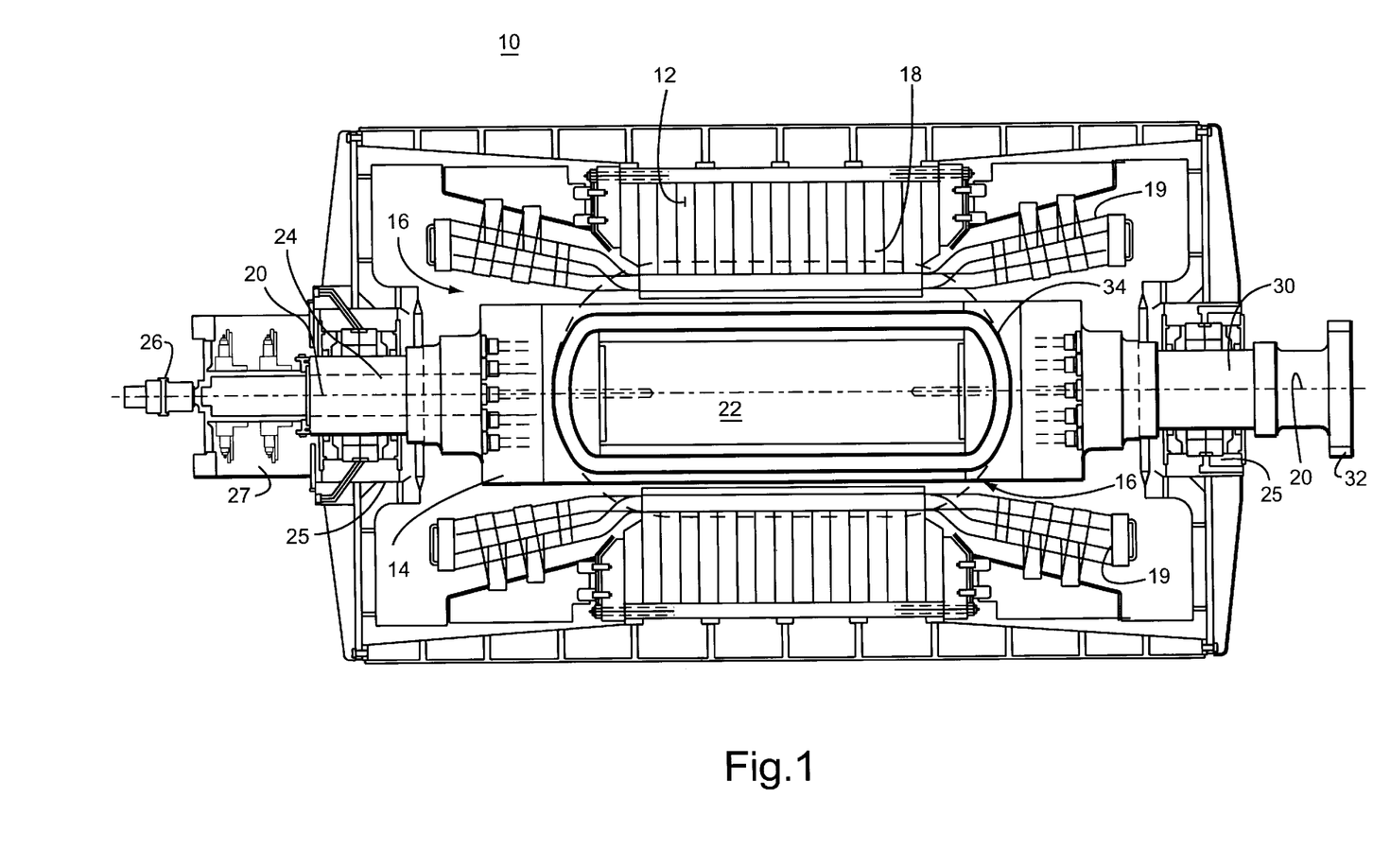
FIG. 1 is a schematic side view of schematic super-conducting (SC) rotor shown within a stator.

FIG. 1 shows an exemplary synchronous generator machine 10 having a stator 12 and a rotor 14. The rotor includes field winding coils 34 that fit inside the cylindrical rotor vacuum cavity 16 of the stator. The rotor 14 fits inside the rotor vacuum cavity 16 of the stator. As the rotor turns within the stator, a magnetic field 18 (shown by dotted lines) generated by the rotor and rotor coils moves through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force (MMF), and, thus, minimize the coil winding usage. For example, the iron of the rotor can be magnetically saturated at an air-gap magnetic field strength of about 2 Tesla.

The rotor 14 supports a generally longitudinally-extending, race-track shaped high temperature super-conducting (HTS) coil winding. HTS coil winding may be, alternatively, a saddle-shape coil or have some other coil winding shape that is suitable for a particular HTS rotor design. The cooling system disclosed here may be adapted for coil winding and rotor configurations other than a race-track coil mounted on a solid core rotor.

The rotor includes end shafts 24, 30 that bracket the core 22 and are supported by bearings 25. The collector end shaft 24 has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. An exemplary cryogen transfer coupling is disclosed in commonly-owned and copending U.S. patent application Ser. No. 09/854,931; filed May 15, 2001, entitled "Synchronous Machine Having Cryogenic Gas Transfer Coupling to Rotor With Super-conducting Coils," the entirely of which is incorporated by reference. The collector end shaft may also include collector rings 27 to connect the rotor coil 34 to an external electrical device or power supply. The drive end shaft 30 may have a power turbine coupling 32.

Figure 2:
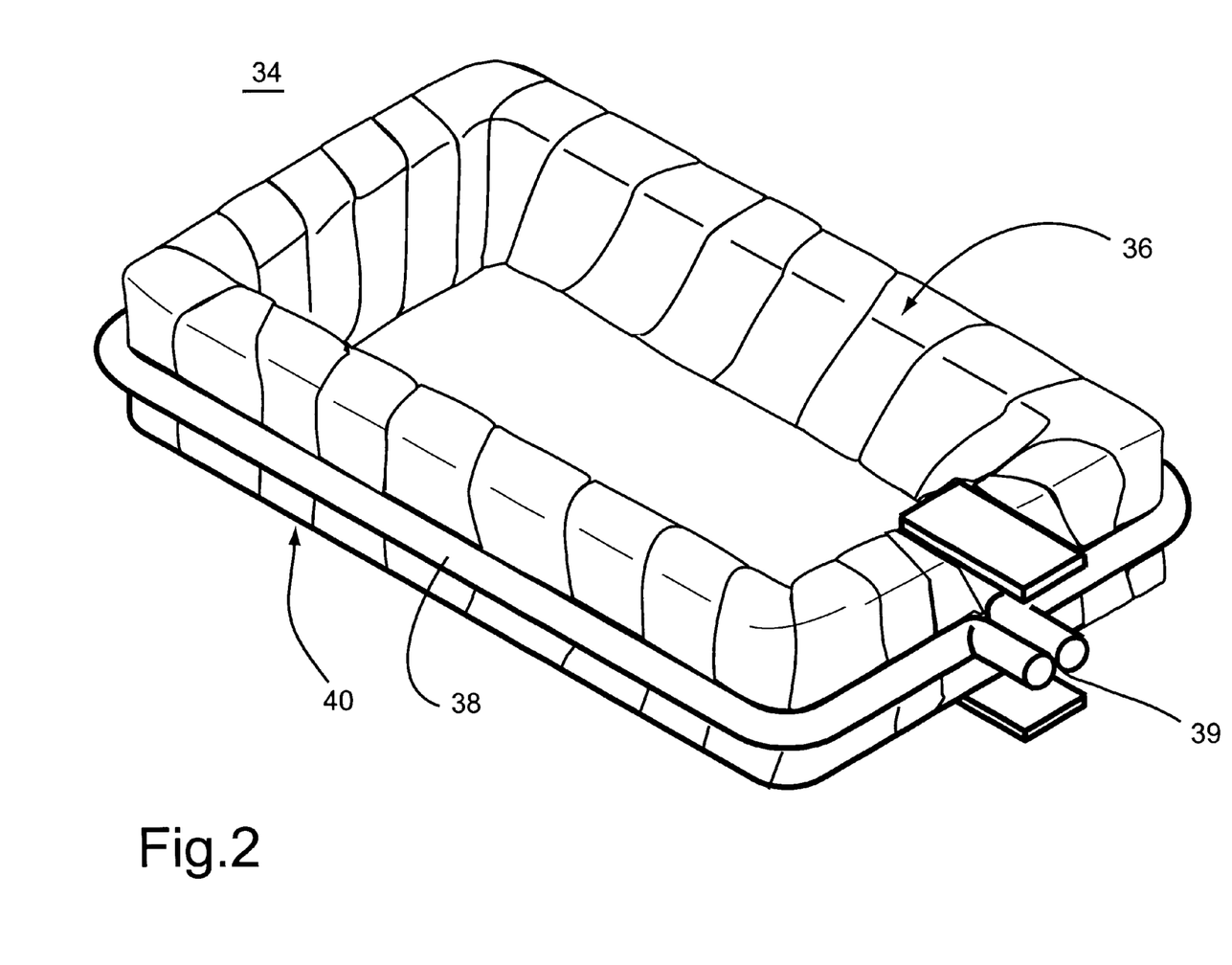
FIG. 2 is a schematic perspective view of a race-track SC coil having cooling gas passages.

FIG. 2 shows an exemplary HTS race-track field coil winding 34. The SC field winding 34 of the rotor includes a high temperature super-conducting coil 36. Each HTS coil includes a high temperature super-conductor, such as BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

HTS wire is brittle and easy to be damaged. The HTS coil is typically layer wound with HTS tape, then epoxy impregnated. The HTS tape is wrapped in a precision coil form to attain close dimensional tolerances. The tape is wound around in a helix to form the race-track SC coil 36.

The dimensions of the race-track coil are dependent on the dimensions of the rotor core. Generally, each race-track coil encircles the magnetic poles of the rotor core, and is parallel to the rotor axis. The HTS coil windings are continuous around the race-track. The coils form a resistancefree current path around the rotor core and between the magnetic poles of the core.

Fluid passages 38 for cryogenic cooling fluid are included in the coil winding 34. These passages may extend around an outside edge of the SC coil 36. The passageways provide cryogenic cooling fluid to the coils and remove heat from those coils. The cooling fluid maintains the low temperatures, e.g., 27° K., in the SC coil winding needed to promote super-conducting conditions, including the absence of electrical resistance in the coil. The cooling passages have input and output ports 39 at one end of the rotor core. These ports 39 connect to cooling passages 38 on the SC coil to the cryogen transfer coupling 26.

Figure 3:
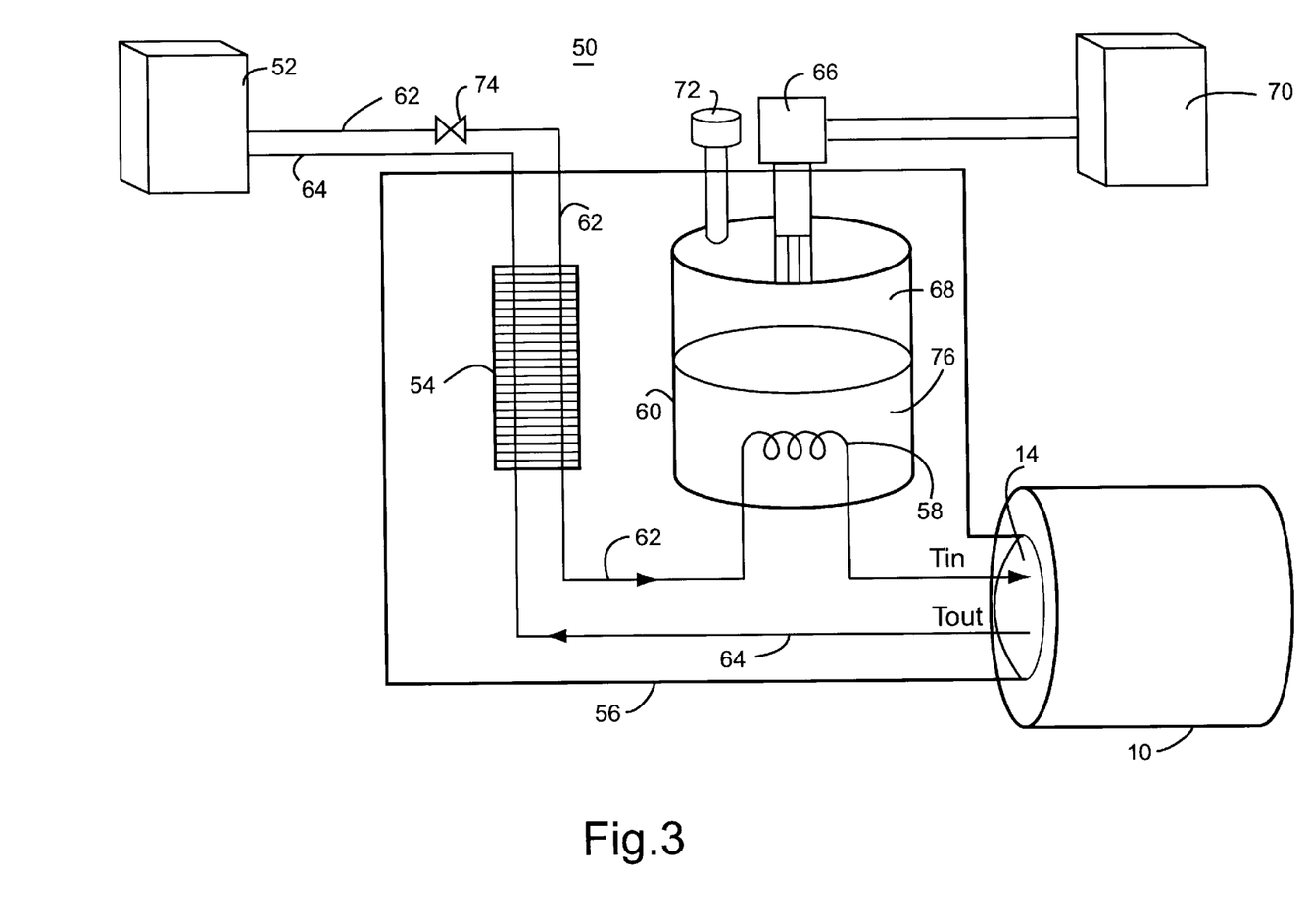
FIG. 3 is a schematic diagram of a cryogenic cooling system to supply cooling fluid to an SC rotor.

FIG. 3 is a schematic diagram of a cryorefrigeration system 50 for an HTS generator 10. A re-circulation compressor 52 supplies compressed ambient temperature gas, i.e., 300° K. (Kelvin), to a counter-flow heat exchanger 54 in a cold box 56. The compressor 52 may include a source, e.g., storage container, of cooling fluid. The counter-flow heat exchanger cools the gas to cryogenic temperature by transferring heat from the compressed gas to used cooling gas returning from the rotor 14 of the generator 10.

The cold compressed gas from the heat exchanger is cooled further by passing through a cooling coil 58 inside a cryogen storage tank 60. Cryogenic liquid 76 in the tank reduces the temperature of the cooling fluid in the coil 58 to cryogenic temperatures, such as below 30° K. The cooled gas from the coil 58 is supplied to the HTS generator 10 at an inlet temperature (Tin) to cool the HTS rotor winding.

The return gas from the generator exits at a temperature (Tout) and proceeds through the counter-flow heat exchanger 54 to return to the re-circulation compressor 52 at ambient temperature. Piping 62 provides a flow passage for the cooling fluid from the re-circulation compressor 52, through the cold box 56, and to the generator. Return piping 64 provides a return passage for the gas from the generator, through the cold box and to the re-circulation compressor. The cold box is an insulated portion of the system 50 that is maintained at cryogenic temperatures, such as by using vacuum jacketed insulation for the piping of the inlet and return lines and insulation around the storage tank and heat exchanger. The cold box may establish a vacuum around the cooling components in the box. Moreover, the cold box extends to the rotor to ensure that the cooling fluid does not adsorb unnecessary heat.

The cooling fluid may enter the rotor as a gas or liquid, and may evaporate as it flows around the SC coils. The evaporation of the cooling fluid cools the SC coils and ensures that the coils operate in super-conducting conditions. The evaporated cooling fluid flows as a cold gas from the HTS rotor, through the return pipeline 64. The return line is sized to pass the cold cooling gas from the rotor to the re-circulation compressor.

The cryogen storage tank 60 holds a supply of liquid cryogen fluid that is maintained at a constant cryogenic temperature by a cryorefrigerator recondenser 66 that is located in a vapor space 68 of the storage tank. The cryogen fluid 76 is used solely to cool the cooling fluid flowing through the coil 58 in the tank. The cryogen fluid 76 in the tank does not mix with the cooling fluid used to cool the SC windings 34 in the rotor.

The re-condenser cryorefrigerator 66 may be single stage Gifford-McMahon cryocooler or pulse tube with separate or integral cryocooler compressor 70 with a re-condenser unit attached to the single stage. Single or multiple cryorefrigerator units (only one is shown in FIG. 3) may be used to recondense the vapor 68 in the storage tank as required to meet the cooling requirements of the circulation gas in the cooling coil 58 inside the liquid.

The temperature of the cooling gas in the circulation gas system is controlled by the selection of cryogen liquid in the storage tank. The cryogen cooling gas in the inlet and return line of the re-circulation system (e.g., the re-circulation compressor, heat exchanger, coil and inlet and return lines) is preferably helium but can also be nitrogen, neon, or hydrogen if the HTS rotor operating temperature will not fall below 77° K., 27° K., or 20° K. respectively. If the SC coil 34 in the HTS rotor 10 is to be cooled to a Tin of 80° K., then the liquid nitrogen may be used in the storage tank to cool the cooling coil. Liquid neon in the re-circulation system may be used to cool the coils in the HTS rotor to about 30° K., and liquid hydrogen may be used to cool the rotor to about 20° K.

The cryogen fluid in the storage tank may be liquid neon if the coils in the HTS rotor are to be cooled to about 30° K., and liquid hydrogen if the coils are to be cooled to about 20° K. The temperature of the storage tank is controlled by the equilibrium pressure in the tank as the capacity of the re-condenser unit 66 meets the demand of the cooling coil. A pressure relief valve 72 is provided to operate the cooling system in an open-loop mode, in case the cryorefrigerator shuts down. Open-loop mode is used to maintain the cryogenic temperature of the cryogen liquid 76, if and when the re-condenser unit is disabled for maintenance or due to failure. In open-loop mode, the pressure of the vapor 68 is minimized, e.g., held to ambient pressure, in order to minimize the pressure in the tank and reduce the temperature of the liquid 76.

The cryogen storage tank 60 has sufficient storage capacity to allow the refrigeration unit 66 to be shut down for maintenance or replacement without affecting the operation of the rotor. During the shut-down periods of the cryorefrigerator, the storage tank operates open-loop, discharging the cryogen vapor to the outside atmosphere through the pressure relief valve. Lost cryogen liquid is replenished by refilling the storage tank after the cryorefrigerator is back in operation. The storage tank provides cooling for the gas cooling the rotor even when the refrigeration unit 66 is not functioning. Thus, the proposed HTS cooling system provides high reliability with low-cost, non-redundant components.

The storage volume of the tank 60 is sized to provide sufficient liquid 76 to cool the cooling fluid flowing to the rotor over the period of time that the recondenser 66 is shut down, such as for one day, for example, in which case the typical storage tank capacity required to operate the HTS rotor at 30° K. would be about 100 liters of liquid neon.

Cooling fluid flows in a closed loop of the re-circulation system. The cooling fluid from the re-circulation compressor 52 flows through an inlet pipe 62 that passes through the cold box 56 and is coupled to a cooling transfer coupling 26 of the rotor 14. In the transfer coupling and rotor, the cooling fluid passes through vacuum-jacketed cooling passages in the end shaft 24 and through the cooling passages 38 around the SC coils 36. The cooling fluid maintains the SC coil 36 in the rotor at cryogenic temperatures by convection heat transfer or evaporative cooling and ensures that the coils operate in super-conducting conditions.

Used cooling fluid, typically in the form of a cold gas, exits the cooling passage 38 of the coil, flows through the vacuum-jacketed passages in the end shaft and through the cooling coupling 26 to exit the rotor 14. A return transfer line 64 carries the return cooling fluid from the rotor to the cold box 56 and then to the re-circulation compressor 52. The inlet and transfer lines in the cold box 56 are vacuum jacketed and, thus, heavily insulated. The vacuum insulation of the transfer lines and cold box minimizes heat transfer losses in the cooling fluid as it flows from the tank to the rotor, and from the rotor to the tank. It is not necessary to vacuum jacket the lines between the cold box and re-circulation compressor. A flow valve 74 controls the flow of gas from the re-circulation compressor to the cold box 56.

The recondenser 66 need not operate continuously as the tank has a supply of liquid cooling fluid for the HTS rotor. The liquid cooling fluid 76 in the tank provides an uninterruptible cooling system for cooling the cooling fluid that circulates through the HTS rotor. Thus, the recondenser may be serviced while the HTS generator continues uninterrupted operation. The recondenser may temporarily fail without necessitating that the HTS rotor be shut down while the recondenser is repaired. When the HTS rotor is shut down for normal service the tank can be serviced via a service stack to the tank.

Figure 4:
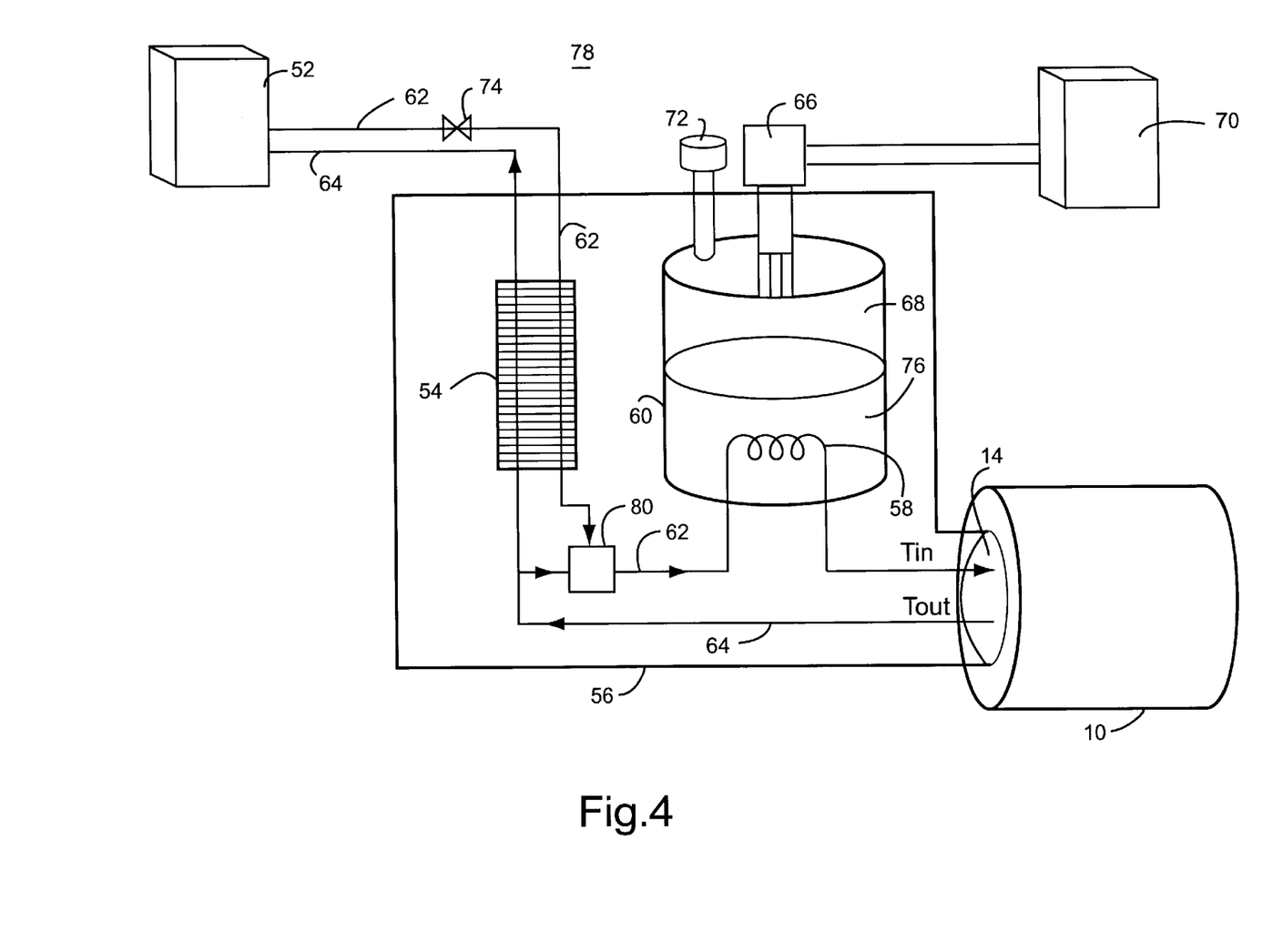
FIG. 4 is a schematic diagram of a second embodiment of a cryogenic cooling system.

FIG. 4 is a schematic diagram of a second embodiment of a cryogenic cooling system 78. The components in the second cooling system 78 that are common to the first cooling system 50 have been identified with common reference numbers in FIGS. 3 and 4.

The cooling system 78 shown in FIG. 4 further includes an ejector 80 that pumps used cooling fluid from the return line 64 into the inlet line 62. The cooling fluid that re-enters the inlet line from the return line through the ejector bypasses the re-circulation compressor 52 and heat exchanger 54. Thus, the fluid load on the compressor and heat exchanger is reduced when using the ejector. The ejector 80 allows for the use of a smaller heat exchanger and compressor, than would be otherwise necessary.

Figure 5:
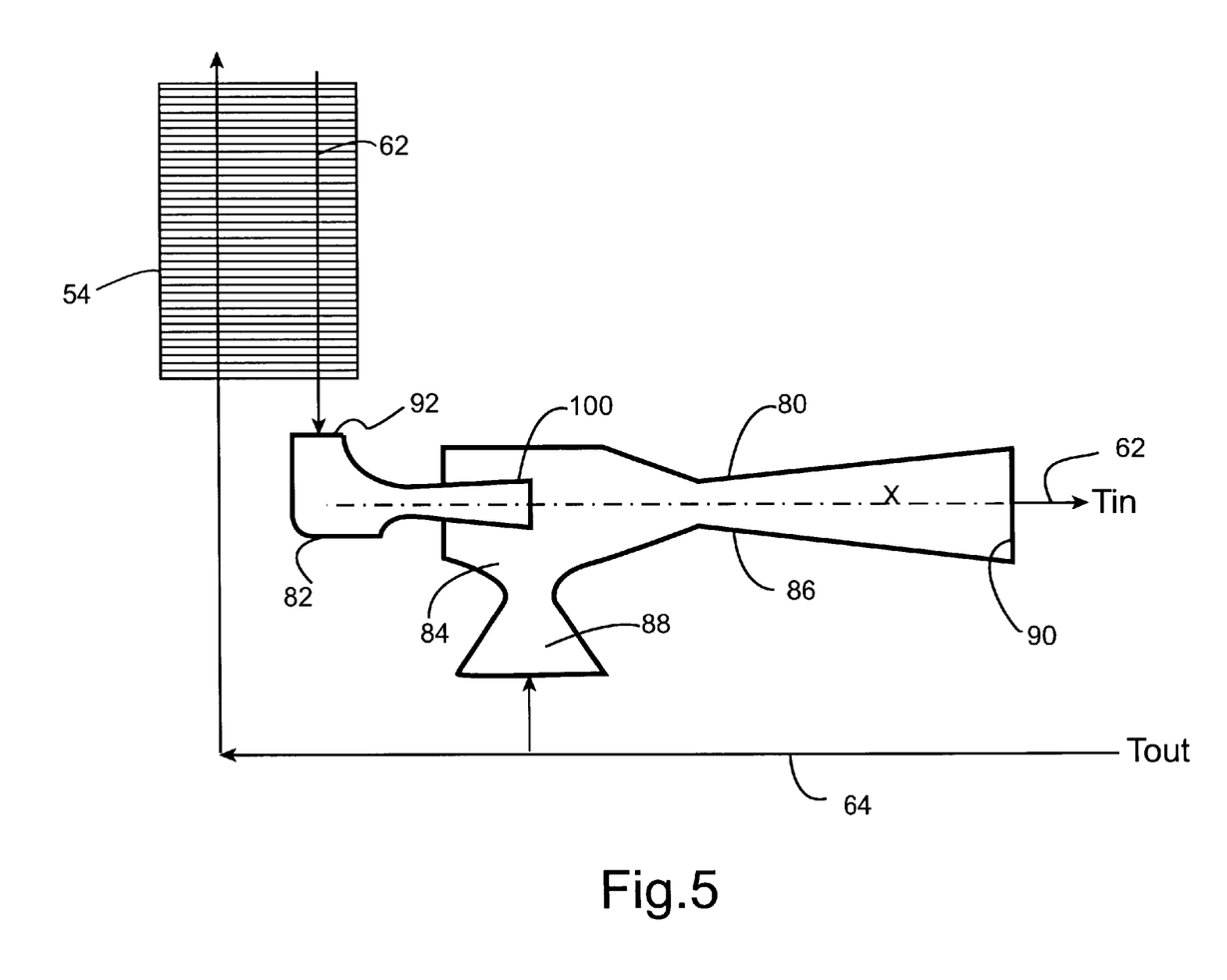
FIG. 5 is a schematic diagram of an ejector of the second embodiment.

FIG. 5 shows a detailed schematic diagram of the ejector 80 which is basically a static pump for cooling fluid. The ejector includes a first convergent-divergent nozzle 82, a diffuser zone 84 and a second convergent-divergent nozzle 86. The inlet 92 to the first nozzle is connected to the inlet line 62 and receives the return cooling fluid flow from the heat exchanger 54. As the high pressure flow passes through the first nozzle, its velocity substantially increases as it jets from the outlet 94 of the nozzle and into the diffuser 84 at a relatively-low static pressure. This low pressure draws used coolant into the diffuser 84 from the return line 64 via the inlet port 88. The inlet port 88 may be aligned with the axis of the ejector so that the return cooling fluid enters the ejector along the axis.

The used coolant is entrained with the coolant jet from the first nozzle and both form a stream that passes through a second convergent-divergent nozzle 86 having a relatively-large diameter outlet 90. The second nozzle slows the jet stream from the first nozzle (which now includes the return fluid), and thereby increases the pressure (to greater than the pressure in the diffuser and return line) of the stream as it re-enters the inlet line 62 at the outlet 90 of the ejector. The pressure of the coolant in the inlet line 62 downstream of the diffuser is sufficient to move the coolant through the rotor, SC coil windings and the return line.

A relatively-low volume, high pressure cooling fluid flow from the re-circulation compressor may be used to cause the ejector to pump a larger volume of fluid from the return line to the inlet line. In the inlet line, the high pressure flow stream from the heat exchanger 54 enters the convergent-divergent nozzle at inlet 92. At the nozzle discharge 94 and in the diffuser 84, the fluid pressure of the stream is low and its velocity is high. The lower pressure in the diffuser causes used cooling fluid to flow into the ejector from the return line through inlet port 88.

The fluid momentum is conserved (except for losses due to friction) as the coolant stream through the ejector. The high pressure of the inlet line coolant stream is converted to a high velocity stream in the first nozzle 82. The momentum of that stream along the axis of the ejector (x-axis) is conserved. The flow of return line cooling fluid merges with the high velocity stream in the diffuser. The total momentum of the two streams is substantially the sum of the momentum each of the two streams along the ejector axis. This total momentum drives the merge stream through the second nozzle 86 which has a large diameter outlet 90 to convert stream velocity into pressure. The pressure of the outlet stream moves the cooling fluid in the inlet line downstream of the ejector, through the coil, rotor and return line.

The flow through the first nozzle 82 is typically a fraction of the flow being pumped through the ejector and the mixed flow exiting the ejector. The high pressure of the flow stream in the inlet line 62 from the heat exchanger creates sufficient momentum in a relatively-low volume stream to draw a majority of the cooling fluid in the return line and to drive the mixed stream of cooling fluid from the ejector through the rest of the system 78.

Because a relatively-small flow of cooling fluid is needed at the first nozzle inlet 92, the cooling fluid flow through the re-circulation pump and heat exchanger is only a fraction of the flow circulation of cooling fluid through the HTS rotor. As a result, the heat exchanger size is reduced considerably and its efficiency is not as critical to the efficiency of the overall cryorefrigerator. Similarly, the re-circulation compressor 52 may be small and require less power than would a compressor in a system 50 without an ejector. Thus, one benefit of using the ejector in the cryorefrigerator system is the significant reduction in the size and cost of the heat exchanger and compressor, and higher system efficiency due to the reduction in the heat exchanger losses and in compressor power requirements.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A cooling fluid system for providing cryogenic cooling fluid to an apparatus comprising:
    a re-circulation compressor;
    a storage tank having a cryogenic fluid;
    an inlet line connecting the re-circulation compressor to the storage tank and to the apparatus, and forming a passage for cooling fluid to pass from the re-circulation compressor through the storage tank and to the apparatus, and
    a return line providing a fluid passage for the cryogenic fluid flowing from the apparatus to the re-circulation compressor.

2. A cooling fluid system as in claim 1 further comprising a heat exchanger coupled to said return line, and said inlet line passes through the heat exchanger.

3. A cooling fluid system as in claim 2 wherein said cooling fluid in the inlet line flows in an opposite direction through the heat exchanger than a flow direction of the cooling fluid in the return line.

4. A cooling fluid system as in claim 1 wherein said inlet line includes a heat exchanger coil in the storage tank.

5. A cooling fluid system as in claim 1 wherein the cryogenic cooling fluid is selected from a group consisting of helium gas, hydrogen gas, neon gas and nitrogen gas.

6. A cooling fluid system as in claim 2 wherein the cryogenic cooling fluid is liquid in the inlet line, and is a vapor in the return line.

7. A cooling fluid system as in claim 1 further comprising a recondenser coupled to the tank.

8. A cooling fluid system as in claim 7 wherein the recondenser includes a cryocooler compressor.

9. A cooling fluid system as in claim 1 wherein the second cryogenic cooling fluid in said storage tank is selected from a group consisting of hydrogen liquid, neon liquid or nitrogen liquid.

10. A cooling fluid system as in claim 1 wherein said tank has a relief valve.

11. A cooling fluid system coupled to a high temperature super-conducting rotor for a synchronous machine, said system and a source of cryogenic cooling fluid comprising:
    a re-circulation compressor;
    a cryogenic storage tank storing a supply of cryogenic fluid;
    an inlet line providing a fluid passage for cooling fluid between the re-circulation compressor and the rotor, wherein the inlet line passes through the storage tank, and
    a return line providing a fluid passage for the cooling fluid between the rotor and re-circulation compressor.

12. A cooling fluid system as in claim 11 further comprising a cryorefrigerator cooling the cryogenic fluid in the storage tank.

13. A cooling fluid system as in claim 12 wherein said inlet transfer line and return transfer line both extend through a heat exchanger.

14. A cooling fluid system as in claim 11 wherein the cryogenic cooling fluid is selected from a group consisting of helium gas, hydrogen gas, neon gas and nitrogen gas.

15. A cooling fluid system as in claim 11 wherein the cryogenic cooling fluid is liquid in the inlet line, and is a vapor in the return line downstream of the storage tank.

16. A cooling fluid system as in claim 11 wherein the cryogenic fluid in said cryogenic storage tank is selected from a group consisting of hydrogen liquid, neon liquid and nitrogen liquid.

17. A cooling fluid system as in claim 11 wherein said tank has a pressure relief valve.

18. A method for cooling an apparatus using a cooling fluid system having a cooling fluid circuit, a cryogenic storage tank, a heat exchanger and inlet and return lines for cooling fluid, said method comprising the steps of:

a. pumping the cryogenic cooling fluid through the inlet line, through the heat exchanger, the storage tank and into the machine;
b. transferring heat from the cooling fluid in the inlet line at the heat exchanger and into the return line, where the inlet and return lines pass through the heat exchanger;
c. cooling the cooling fluid to cryogenic temperature in the storage tank, and
d. returning used cooling fluid from the apparatus, through the return line and back to the inlet line.

19. A method for cooling as in claim 18 wherein the cooling fluid is pumped through a coil in the storage tank, and the storage tank is downstream of the heat exchanger in the inlet line.

* * * * *